United States Patent
Sen et al.

(10) Patent No.: US 7,827,531 B2
(45) Date of Patent: Nov. 2, 2010

(54) SOFTWARE TESTING TECHNIQUES FOR STACK-BASED ENVIRONMENTS

(75) Inventors: Siddhartha Sen, Bellevue, WA (US); Amit Date, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 972 days.

(21) Appl. No.: 11/650,512

(22) Filed: Jan. 5, 2007

(65) Prior Publication Data

US 2008/0168425 A1 Jul. 10, 2008

(51) Int. Cl.
*G06F 9/44* (2006.01)

(52) U.S. Cl. .................. 717/124; 717/134; 717/135

(58) Field of Classification Search ............ 717/134, 717/135

See application file for complete search history.

(56) References Cited

U.S. PATENT DOCUMENTS

| | | | |
|---|---|---|---|
| 5,193,178 A | 3/1993 | Chillarege | |
| 6,480,801 B2 | 11/2002 | Chew | |
| 6,516,053 B1 | 2/2003 | Ryan | |
| 6,539,539 B1 | 3/2003 | Larsen | |
| 6,567,381 B1 | 5/2003 | Jeon | |
| 6,640,203 B2 | 10/2003 | Brown | |
| 6,901,357 B1 * | 5/2005 | Patiejunas | 703/14 |
| 6,941,546 B2 * | 9/2005 | Apuzzo et al. | 717/135 |
| 7,020,797 B2 | 3/2006 | Patil | |
| 7,310,798 B1 * | 12/2007 | Gunara et al. | 717/135 |
| 2003/0195861 A1 | 10/2003 | McClure | |
| 2004/0060057 A1 | 3/2004 | Hansen | |
| 2006/0248403 A1 | 11/2006 | Somogyvari | |

FOREIGN PATENT DOCUMENTS

| | | |
|---|---|---|
| WO | WO9746941 A1 | 12/1997 |
| WO | WO02082727 A1 | 10/2002 |

OTHER PUBLICATIONS

Voas, Jeffrey M., Certifying Off-the-Shelf Software Components, IEEE, Jun. 1998.
Gannon, John, Validation, Verification, and Testing of Computer Software, ACM Transactions on Programming Languages and Systems, vol. 3, No. 3, Jul. 1981, pp. 211-233.
Sthamer, Harmen, Using Evolutionary Testing to improve Efficiency and Quality in Software Testing, 2005.
Adrion, W. Richards, Validation, Verification, and Testing of Computer Software, Computing Surveys, vol. 14, No. 2, Jun. 1982.

\* cited by examiner

*Primary Examiner*—Wei Y Zhen
*Assistant Examiner*—Phillip H Nguyen
(74) *Attorney, Agent, or Firm*—Mayer & Williams PC (57) ABSTRACT

Techniques for testing software applications in stack-based computing environments are discussed. A tested application is executed at predetermined logical positions in a stack, such as at a layer of the OSI reference model. An expected result of an operation performed by the application is identified. A first set of computer-executable instructions is installed at a first position logically above the tested application, and a second set of computer-executable instructions is installed at a second position logically below the tested application. One or both sets of instructions simulate inputs to the application. The application is executed based on the simulated inputs, and one or both sets of instructions are used to compare outputs from the application with the expected result. Various, virtually unlimited tests can be performed on the software application without the use of extensive test infrastructure.

18 Claims, 4 Drawing Sheets

SOFTWARE TESTING TECHNIQUES FOR STACK-BASED ENVIRONMENTS

BACKGROUND

It is generally desirable to locate and correct defects that adversely affect the operation of software products. Software developers have a wide variety tools and techniques for analyzing, describing, and documenting the behavior of software. "White box" testing tools and techniques verify the internal operation of software. "Black box" testing tools and techniques identify defects that occur when software interacts with external components or data.

Most commercially valuable software products have large numbers of possible configurations. The size and complexity of the testing infrastructure desirable for testing each configuration of a software product in a repeatable and deterministic manner often makes extensive white-box and black-box testing impractical and prohibitively expensive. Testability problems are exacerbated in stack-based computing environments, in which there is a hierarchy of software layers where interaction with the layer above or below occurs through a common interface specification. In stack-based computing environments, the operation of tested software is dependent on other components or data.

One example of a stack-based computing environment is a distributed computing system, such as a client/server system, which utilizes various protocol stacks. A protocol stack is a prescribed hierarchy of software layers used in a communication network. Other stack-based computing environments exist, such as storage stacks, and it is known for computing systems and aspects thereof to manipulate various types of stacks. Examples of testability problems in a stack-based computing environment include but are not limited to: difficulties replicating interdependencies between tested software and other components or data; difficulties identifying sources of errors; and the significant amount of hardware, software, and setup overhead that is generally required for administration of interoperability/performance tests.

SUMMARY

Methods, systems, apparatuses, and articles of manufacture for testing software applications that are executable in stack-based computing environments are discussed herein. A stack-based computing environment may be, for example, a distributed computer system, such as client-server system, or a single-computer system. Generally, software application execution affects contents of a logical or physical stack, such as a protocol stack or a data stack.

In accordance with the tools and techniques described herein, a software application is generally executable at a predetermined logical position in a stack-based computing environment. An operation performed during execution of the software application, and an expected result thereof, are identified. A first set of computer-executable instructions is set up at a first test position in the stack-based computing environment, and a second set of computer-executable instructions is set up at a second test position in the stack-based computing environment. The first position is logically above the predetermined position of the software application, and the second position is logically below the predetermined position of the software application. Thus, the software application can be considered to be logically "sandwiched" between the first and second sets of computer-executable instructions. It may be desirable for a single set of computer-executable instructions in binary form (which may determine its true position dynamically at runtime) to be attached above and below the software application.

Once the first and second set of computer-executable instructions have been set up to logically "sandwich" the software application, one or both sets of computer-executable instructions are executed to simulate inputs to the software application. The software application is executed based on the simulated inputs, and outputs from the software application are validated via execution of one or both sets of computer-executable instructions, as appropriate. In this manner, various, virtually unlimited, tests and types thereof can be performed on the software application (such as generation and validation of incoming/outgoing traffic, simulation of interoperability interfaces, stress testing, load distribution testing, and performance measuring)—and test results can be identified—without the use of extensive test infrastructure. User input may be considered to determine which configurations, simulated inputs, and/or tests should be selected. Alternatively, testing can be fully automated and performed according to any desired schedule.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

Testing tools and techniques for software applications operable in stack-based computing environments are discussed herein. The exemplary stack-based computing environment discussed herein is a client-server networking environment. One type of stack in a client-server networking environment is a communication protocol stack. A communication protocol stack is a set of protocols used for communicating via a network. Generally, the protocols are implemented by a prescribed hierarchy of software layers used by both clients and servers for the transmission of data—with lower layers providing predefined services and information to upper layers. The layered approach allows the substitution of different protocols to accommodate different network architectures. Examples of communication protocol stacks include layers of protocols associated with the TCP/IP reference model, and layers of protocols associated with the Open Systems Interconnection ("OSI") reference model. The OSI reference model, which is discussed herein, has seven logical layers: layer 1, the Physical Layer; layer 2, the Data Link Layer; layer 3, the Network Layer; layer 4, the Transport Layer; layer 5, the Session Layer; layer 6, the Presentation Layer; and layer 7, the Application Layer.

The exemplary software application discussed herein is a driver, such as the Network Load Balancing ("NLB") driver, which operates within servers at the Network Layer of the OSI reference model to provide load balancing of IP-based communications such as network packets. The NLB driver sits above the network interface card (and miniport driver) and below the protocols (for example, TCP/IP), applications, etc. that sit higher up in the OSI reference model. An NLB driver allows individual servers to receive relevant network packets based on predetermined parameters, so individual servers are not overwhelmed by the task of processing the large number of packets received from multiple client-side applications.

A software application is sandwiched between first and second sets of computer-executable instructions in the stack-based computing environment. In one exemplary scenario, the first and second sets of computer-executable instructions are Network Device Interface Specification ("NDIS") filter drivers. Each NDIS filter driver is aware of its respective position in the communication protocol stack and is in communication with the NLB driver.

Once the first and second set of computer-executable instructions have been set up to logically "sandwich" the software application, one or both sets of computer-executable instructions are executed to simulate inputs to the software application. The instance of the filter driver logically below the NLB driver (referred to as the "lower instance" of the filter driver) may generate packets from particular IP addresses, or register for filtering hooks that are communicated to the NLB. The NLB driver processes received packets, and the instance of the filter driver logically above the NLB driver (referred to as the "upper instance" of the filter driver) then verifies expected behavior of the NLB driver. Similarly, the upper instance of the filter driver may generate packets from particular IP addresses, or register for filtering hooks that are communicated to the NLB driver, and the lower instance of the filter driver can verify the expected behavior of the NLB driver. In another example, the upper and lower instances of the filter driver may cooperate to measure how long it takes for the NLB driver to process packets or perform other operations.

Virtually unlimited tests and types thereof can be performed on the software application without the use of extensive test infrastructure. User input may be considered to determine which configurations, simulated inputs, and/or tests should be selected. Alternatively, testing can be fully automated and performed according to any desired schedule.

Figure 1:
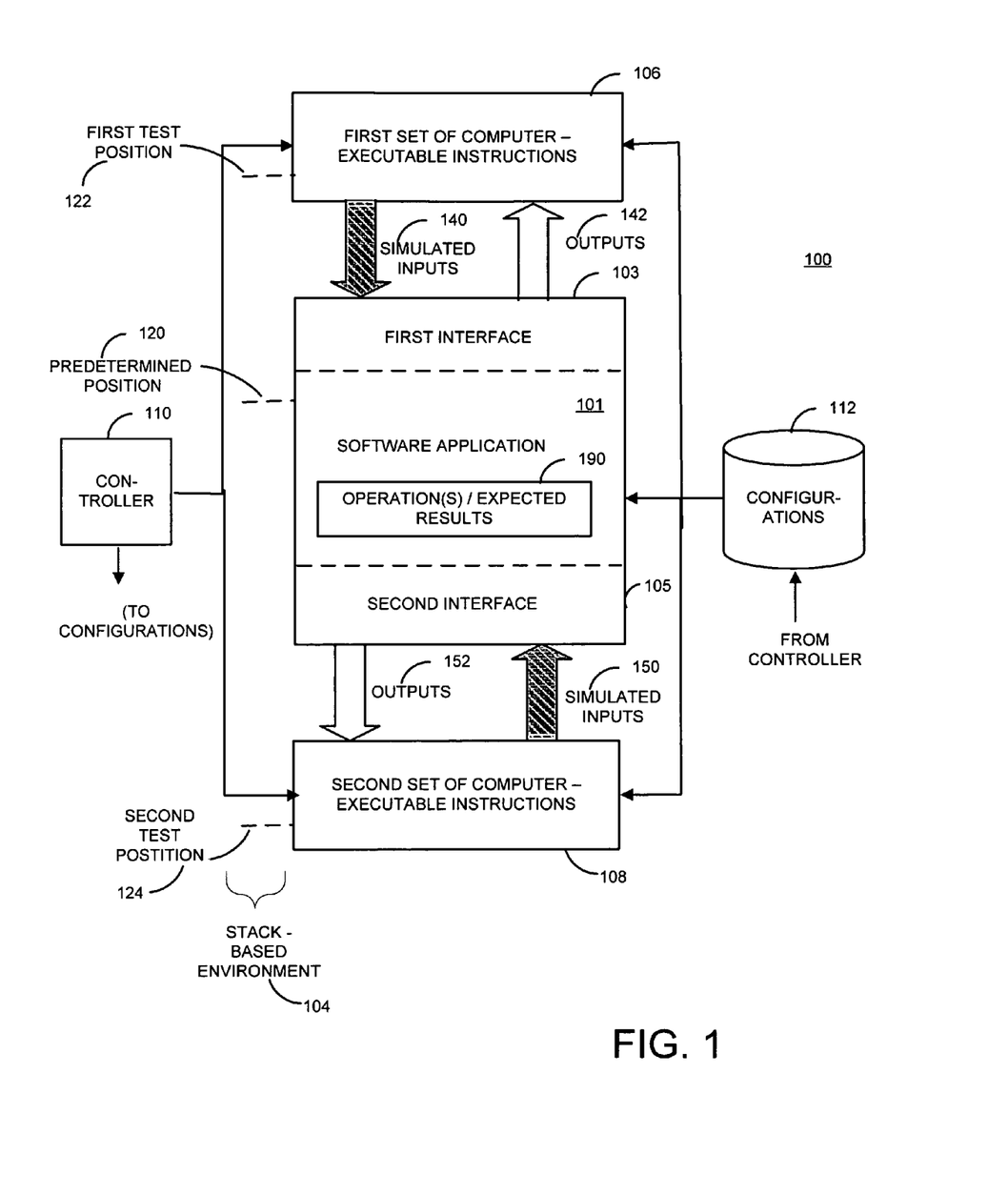
FIG. 1 is a block diagram of an architecture usable for testing a software application in a stack-based environment.

Turning to the drawings, where like numerals designate like components, FIG. 1 is a simplified functional block diagram of an architecture 100 for testing a software application 101 that is executable in a stack-based environment 104. Software application 101 generally occupies and/or or affects a predetermined position 120 in stack-based computing environment 104.

Stack-based computing environment 104 may be any type of stack-based environment, for example, a distributed computer system or network environment, such as client-server system, or a single-computer system. Generally, execution of software application 101 affects contents of a logical or physical stack.

One type of logical stack is a communication protocol stack. A communication protocol stack is a set of protocols used for communicating via a network. Generally, the protocols are implemented by a prescribed hierarchy of software layers used by both clients and servers for the transmission of data—with lower layers providing predefined services and information to upper layers. Protocols govern how information regarding the organization and contents of network packets is communicated between devices. Many devices and software filter packets according to specific criteria or parameters.

The layered approach allows the substitution of different protocols to accommodate different network architectures. Examples of communication protocol stacks include layers of protocols associated with the TCP/IP reference model, and layers of protocols associated with the Open Systems Interconnection ("OSI") reference model. The OSI reference model, which is discussed herein, has seven logical layers: layer 1, the Physical Layer; layer 2, the Data Link Layer; layer 3, the Network Layer; layer 4, the Transport Layer; layer 5, the Session Layer; layer 6, the Presentation Layer; and layer 7, the Application Layer.

Software application 101 represents a computer program having computer-executable instructions, in any form or format, arranged to perform one or more data processing operations 190 having certain expected results. Software application may have one or more configurations/parameters 112, which can be stored in an information repository such as a computer-readable medium (computer-readable media are discussed further below, in connection with FIG. 3). Configurations/parameters 112 are used to determine what, how, and when information should be processed by software application 101.

One example of software application 101 is a Network Load Balancing ("NLB") driver, which operates within networked servers at the Network Layer of the OSI reference model. The NLB driver filters incoming traffic to decide which host in a cluster should process a given connection or request. Other types of software applications 101 are possible. Generally, any software application that resides in, or affects the contents of, a stack, is testable via architecture 100.

As shown, software application 101 has two interfaces—a first interface 103 and a second interface 105. Interface 103 is operable to implement communications based on protocols or data associated with a stack-based environment (reference number 104 denotes a stack-based environment) that are at, or logically higher than, the protocols or data associated with predetermined position 120. It should be noted that predetermined position 120 (as well as test positions 122 and 124, discussed further below), refer to logical positions in stack-based environment 104 occupied by software application 103 (and first and second sets of computer-executable instructions 106 and 108). Interface 105 is operable to implement communications based on protocols or data associated with stack-based environment 104 that are at, or logically lower than, the protocols or data associated with predetermined position 120.

In the context of an NLB driver, interface 103 may be, for example, a network interface implemented in hardware, software, firmware, or any combination thereof, which handles inbound and outbound communication between software application 101 and other components operating at the Network Layer and/or the Transport layer (examples of other components include but are not limited to services such as TCP, IPSec, and Internet Security and Acceleration, which is a firewall service provided by Microsoft® Corporation). Interface 105 may be a network interface implemented in hardware, software, firmware, or any combination thereof, which handles inbound and outbound communication between software application 101 and other components operating at the Network Layer and/or the Data Link Layer.

Referring again to FIG. 1, architecture 100 includes a first set of computer-executable instructions 106, which is set up at/to affect a first test position 122 in stack-based computing environment 104, and a second set of computer-executable instructions 108, which is set up at/to affect a second test position 124 in stack-based computing environment 104. First test position 122 is logically above predetermined position 120 associated with software application 101, and second test position 124 is logically below predetermined position 120. Thus, software application 101 can be considered to be logically "sandwiched" between the first and second sets of computer-executable instructions.

First set of computer-executable instructions 106 is responsible for generating simulated inputs 140 to, and for receiving outputs 142 from, software application 101 via first interface 103. Second set of computer-executable instructions 108 is responsible for generating simulated inputs 150 to, and for receiving outputs 152 from, software application 101 via second interface 105. In one possible implementation, a single binary file attached both above and below software application 101 may implement both first and second sets of computer-executable instructions. The binary file may be attached, and determine its logical position, dynamically at runtime. It will be appreciated, however, that first and second sets of computer-executable instructions may be altogether different, may be written in any programming language, and may exist in any form, such as in source code, object code, or executable code, among other forms.

In the context of NLB driver software, one possible implementation of first and second sets of computer-executable instructions 106, 108 is a filter driver such as a Network Device Interface Specification ("NDIS") filter driver. Each instance of the NDIS filter driver can be programmed to be aware of its respective position in stack-based environment 104. Simulated inputs 140, 150 and outputs 142, 152, all of which are discussed further below in connection with FIG. 2, are generally in the form of digital data transmitted as one or more network packets, encoded according to one or more digital communication protocols at one or more layers of the OSI reference model.

A controller 110, which may accept user input or operate automatically, is operable to facilitate selection of configurations 112, simulated inputs 140, 150, and/or tested operations 190. When user input is accepted, a user interface (not shown), such as a GUI, may be provided. The user interface may also be used to focus attention on defects detected via the use of testing architecture 100.

Figure 2:
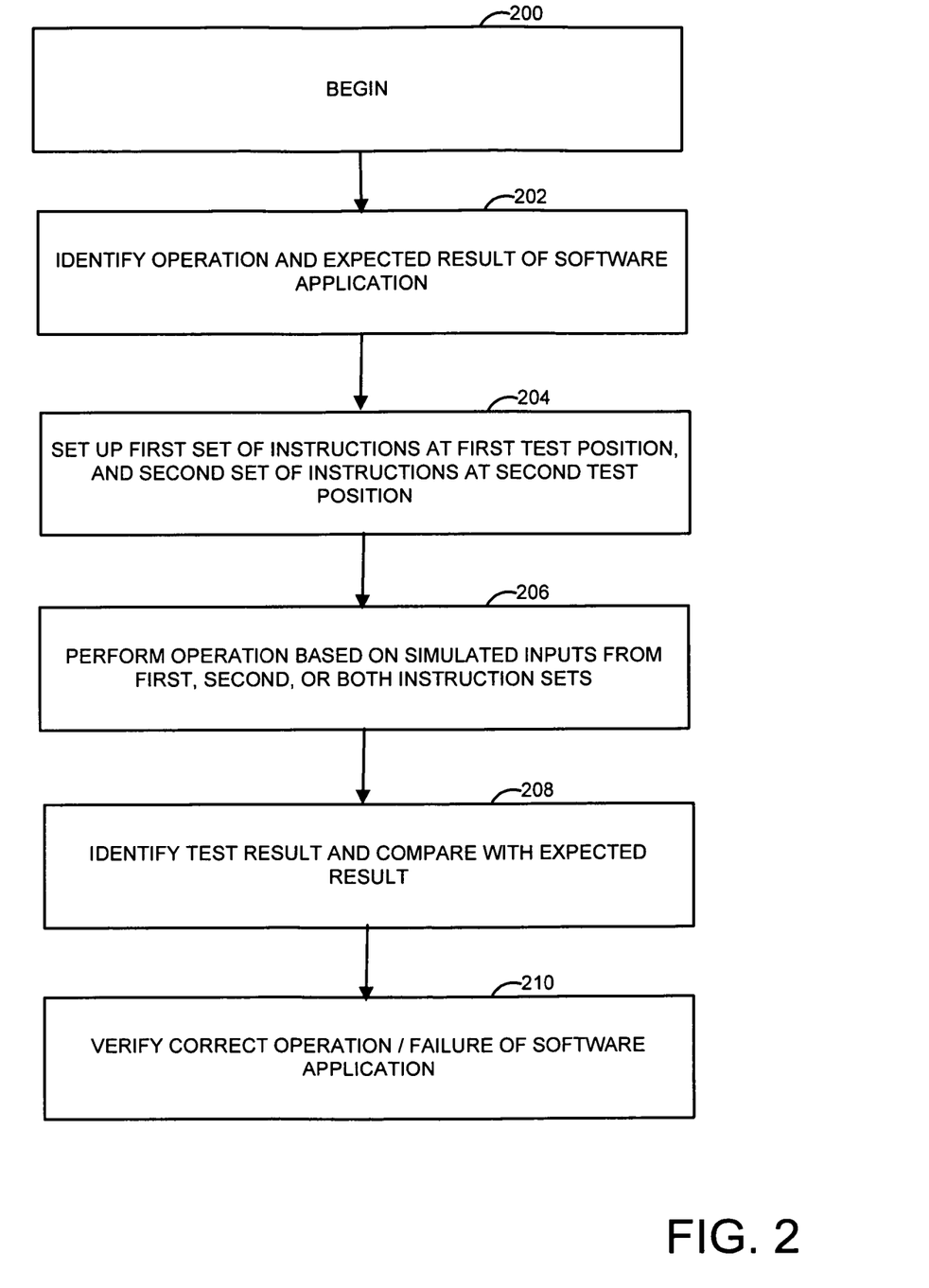
FIG. 2 is a flowchart of a method for testing a software application using aspects of the architecture shown in FIG. 1.

With continuing reference to FIG. 1, FIG. 2 is a flowchart of a method for testing a software application, such as software application 101, which is executable at a predetermined logical position, such as predetermined position 120, of a stack-based computing environment, such as stack-based environment 104.

The method begins at block 200, and continues at block 202, where an operation performed during execution of the software application, and an expected result thereof, are identified. For discussion purposes, software application 101 is assumed to be an NLB driver, which operates to receive and send Network Layer packets via first and second interfaces 103, 105 in accordance with established parameters/configurations 112. Established parameters/configurations 112 are used to determine what information/packets to forward as inputs 140/150 and/or outputs 142/152. User input may be considered to determine which configurations, simulated inputs, and/or tests should be selected. Alternatively, testing can be fully automated (by controller 110, for example) and performed according to any desired schedule.

Next, as indicated at block 204, a first set of computer-executable instructions is set up at a first test position in the stack-based computing environment, and a second set of computer-executable instructions is set up at a second test position in the stack-based computing environment. The first position is logically above the predetermined position of the software application, and the second position is logically below the predetermined position of the software application. Thus, the software application can be considered to be logically "sandwiched" between the first and second sets of computer-executable instructions.

In the exemplary context where software application 101 is an NLB driver, first and second sets of computer-executable instructions 106, 108 may be implemented using NDIS filter drivers. NDIS filter drivers 106, 108 may arise from a single binary file that installs two instances of itself—the upper instance 106 of the NDIS filter driver can be programmed to be aware of its own position (first test position 122) in stack-based environment 104, and the lower instance 108 of the NDIS filter driver can be programmed to be aware of its own position (second test position 124) in stack-based environment 104.

Once the first and second set of computer-executable instructions have been set up to logically "sandwich" the software application, one or both sets of computer-executable instructions simulate inputs (such as simulated inputs 140 and 150) to the software application, and, as indicated at block 206, the software application is executes the identified operation based on the simulated inputs. A test result is identified at block 208, which generally involves identifying outputs 142 and/or 152 from the software application using one or both sets of computer-executable instructions. The test result is compared with the expected result. At block 210, it is determined whether the tested operation of the software application was correct, or whether a failure of the software application occurred.

In the context where first and second sets of computer-executable instructions 106, 108 are NDIS filter drivers (referred to as upper and lower instance filter drivers, respectively), simulated inputs 140, 150 and received outputs 142, 152 may be used to test an NLB driver in various ways.

In one example, it is possible to use inputs 140 and/or 150 to simulate interoperability interfaces. Upper and lower instances of the filter driver can provide inputs 140, 150 that override or specify filtering decisions on a per-packet basis, via the use of hooks or connection notifications (such as connection state notifications and timer notifications) provided/monitored by the NLB driver. In one scenario, the upper instance filter driver 106 registers for all filtering hooks and provides the necessary connection state/SYN attack/timer starvation notifications. Then, the lower instance filter driver 108 detects the response of the NLB driver, and ensures its accuracy. In one example of this scenario, if a filter hook registered by the upper instance filter driver filters all outgoing UDP traffic to a particular IP address, the lower instance filter driver can ensure that no such traffic has been forwarded by the NLB driver. In another example of this scenario, if the upper instance filter driver sends a "TCP connection established" notification for a particular connection, the lower instance filter driver can generate packets from that particular connection—the upper instance can then ensure that the NLB driver accepts those packets. In a further example of this scenario, if the upper instance filter driver notifies the NLB driver that timer starvation has been detected, the rate at which the NLB driver sends out signals in response to the timer starvation detection notice can be measured and verified by the lower instance of the filter driver.

In another example of the manner in which simulated inputs 140, 150 and received outputs 142, 152, may be used, actual packets simulated to be invalid or corrupt that should be filtered by the NLB driver can be provided by the upper or lower instances of the filter driver. In one scenario, invalid or corrupt packets can be provided by the upper instance of the filter driver as simulated inputs 140 to first interface 103, and the lower instance of the filter driver can verify that these packets are not forwarded by the NLB driver. Similarly, invalid or corrupt packets can be provided by the lower instance of the filter driver as simulated inputs 150 to second interface 105, and the upper instance of the filter driver can verify that these packets are not forwarded by the NLB driver.

In a further example, load distribution testing may be performed using simulated inputs 140, 150 and received outputs 142, 152. The lower instance of the filter driver can be used to generate packets from a certain range (or the full range) of IP addresses, and the upper instance of the filter driver used to measure what fraction of the packets are received as outputs 142. The number of packets received should be roughly 1/N, where N is the number of nodes in the NLB cluster. Alternatively, the upper instance of the test driver can send a message to query the filtering algorithm of the NLB driver for each IP address in the specified range, which would indicate whether a particular packet would be accepted or dropped by the NLB driver, and also report the load bucket to which the packet was directed. Using these techniques, a histogram of the overall load distribution across all of the load buckets of the NLB cluster can be generated.

In a still further example, simulated inputs 140, 150 and received outputs 142, 152 may be used to perform stress and performance testing. The upper and lower instances of the filter drivers can cooperate to measure the amount of time taken by the NLB driver to process a given packet or group of packets. The lower instance of the filter driver could stress the NLB driver by indicating a large number (for example, hundreds of thousands) of packets, while the upper instance of the filter driver could measure achieved throughput. Depending on how the measurements are taken, the results can be used to quantify performance of the NLB driver.

It will be appreciated that numerous, virtually unlimited, tests and types thereof can be performed on a particular software application using testing architecture 100, without the use of extensive, expensive test infrastructure, with the further benefit of being able to simulate certain conditions and scenarios that are too difficult, impractical, or expensive to reproduce using end-to-end test infrastructure. Test results may exist only temporarily, or may be stored in ways that allow for later use and analysis, such as being stored in files, databases, or other structures. Statistical data can be used to analyze specific behaviors. Architecture 100 may be used to test any service or component residing in a stack, where traffic flows up or down the stack (or both).

In the case of the NLB driver, which has close interaction with internal and external components, use of the testing tools and techniques described herein allows interoperability errors to be discovered in a timely, cost-effective, and predictable manner. Connections from a wide range of IP addresses (for example, every possible address in the IPv4/IPv6 address space) may be simulated and it is not necessary to investigate transient hardware/network failures, because none of those components are involved in the test infrastructure of architecture 100. The NLB driver is sandwiched/isolated closely, so black-box interactions with the driver may be extensively tested for both internal and external components.

Figure 3:
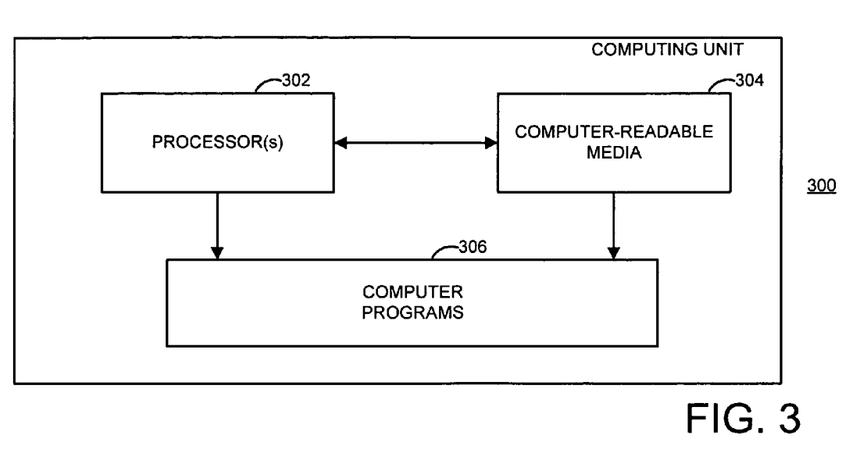
FIG. 3 is a block diagram of a general-purpose computing unit in which aspects of the architecture shown in FIG. 1 or the method illustrated in FIG. 2 may be implemented or used.

FIG. 3 is a block diagram of a general-purpose computing unit 300, illustrating certain functional components that may be used to implement, may be accessed by, or may be included in, various functional components of architecture 100. It will be understood that one or more components of FIG. 3 may be packaged together or separately to implement functions of architecture 100 (in whole or in part) in a variety of ways.

A processor 302 is responsive to computer-readable media 304 and to computer programs 306. Processor 302, which may be a real or a virtual processor, controls functions of an electronic device by executing computer-executable instructions. Such instructions may be created using source code or any other known computer program design tool.

Computer-readable media 304 represent any number and combination of local or remote devices, in any form, now known or later developed, capable of recording, storing, or transmitting computer-readable data, such as the instructions executable by processor 302. In particular, computer-readable media 304 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. Computer-readable media 304 may also include transmission media and data associated therewith. Examples of transmission media/data include, but are not limited to, data embodied in any form of wireline or wireless transmission, such as packetized or non-packetized data carried by a modulated carrier signal.

Computer programs 306 represent any signal processing methods or stored instructions that electronically control predetermined operations on data. In general, computer programs 306 are computer-executable instructions implemented as software components according to well-known practices for component-based software development, and encoded in computer-readable media (such as computer-readable media 304). Computer programs may be combined or distributed in various ways.

Figure 4:
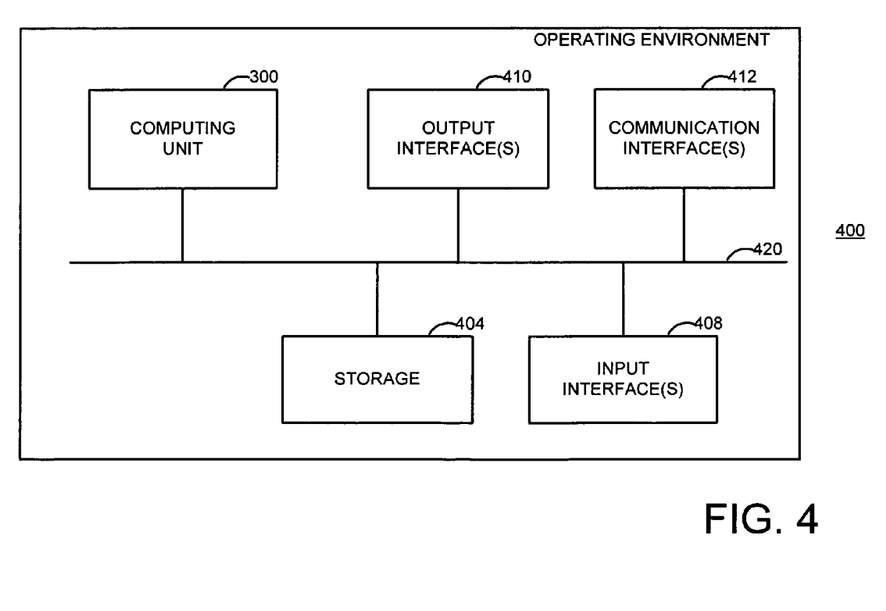
FIG. 4 is a block diagram of a configuration of an operating environment in which aspects of the architecture shown in FIG. 1 or the method illustrated in FIG. 2 may be implemented or used.

FIG. 4 is a block diagram of a configuration of an operating environment 400 in which aspects of architecture 100 may be implemented or used. Operating environment 400 is generally indicative of a wide variety of general-purpose or special-purpose computing environments. Operating environment 400 may be, for example, a type of computer, such as a personal computer, a workstation, a server, a portable device, a laptop, a tablet, or any other type of electronic device now known or later developed, or any aspect thereof. The operating environment may also be a distributed computing network or a Web service, for example.

Input interface(s) 408 provide input to computing environment 400. Input may be collected using any type of now known or later-developed interface, such as a user interface. User interfaces may be touch-input devices such as remote controls, displays, mice, pens, styluses, trackballs, keyboards, microphones, scanning devices, and all types of devices that are used input data.

Output interface(s) 410 provide output from operating environment 400. Examples of output interface(s) 410 include displays, printers, speakers, drives (such as optical disc drive 406 and other disc drives), and the like.

External communication interface(s) 412 are available to enhance the ability of operating environment 400 to receive information from, or to transmit information to, another entity via a communication medium such as a channel signal, a data signal, or a computer-readable medium. External communication interface(s) 412 may be, or may include, elements such as cable modems, data terminal equipment, media players, data storage devices, personal digital assistants, or any other device or component/combination thereof, along with associated network support devices and/or software or interfaces.

Figure 5:
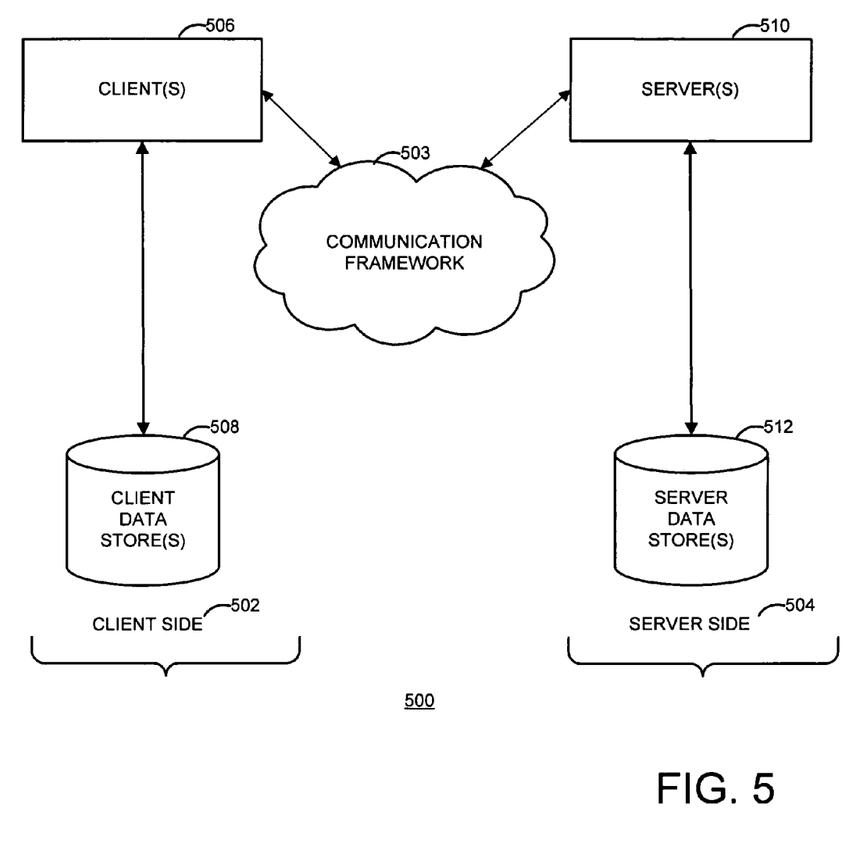
FIG. 5 is a simplified functional diagram of a client-server architecture in which aspects of the architecture shown in FIG. 1 or the method illustrated in FIG. 2 may be implemented or used.

FIG. 5 is a simplified functional diagram of a client-server architecture 500 in connection with which architecture 100 or operating environment 400 may be implemented or used. One or more aspects of architecture 100 and/or operating environment 400 may be represented on a client-side 502 of architecture 500 or on a server-side 504 of architecture 500. As shown, communication framework 503 facilitates communication between client-side 502 and server-side 504. Communication framework 503, and connections throughout, may be any public or private, wired or wireless, data transmission infrastructure or technology.

On client-side 502, one or more clients 506, which may be implemented in hardware, software, firmware, or any combination thereof, are responsive to client data stores 508. Client data stores 508 may be computer-readable media 304, employed to store information local to clients 506. On server-side 504, one or more servers 510 are responsive to server data stores 512. Like client data stores 508, server data stores 512 may include one or more computer-readable media 304, employed to store information local to servers 510.

Various aspects of a software testing architecture have been described. It will be understood, however, that all of the described components of the architecture need not be used, nor must the components, when used, be present concurrently. Functions/components described in the context of architecture 100 as being computer programs are not limited to implementation by any specific embodiments of computer programs. Rather, functions are processes that convey or transform data, and may generally be implemented by, or executed in, hardware, software, firmware, or any combination thereof.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A method for testing a software application, the software application executable at a predetermined logical position in a stack-based computing environment, the method comprising:
   identifying an operation performed during execution of the software application;
   identifying an expected result of the operation;
   arranging for communication between the software application and a first set of computer-executable instructions at a first test position in the stack-based computing environment, the first test position logically above the predetermined logical position, the first set of computer-executable instructions executable to implement a first interaction with the software application;
   arranging for communication between the software application and a second set of computer-executable instructions at a second test position in the stack-based computing environment, the second test position logically below the predetermined logical position, the second set of computer-executable instructions executable to implement a second interaction with the software application;
   executing the software application to perform the operation using an input generated via execution of the first set of computer-executable instructions or the second set of computer-executable instructions;
   identifying a test result of the operation via execution of the first set of computer-executable instructions or the second set of computer-executable instructions;
   comparing the test result and the expected result; and
   based on the step of comparing, determining whether a failure of the software application occurred.

2. The method according to claim 1, wherein
   execution of the software application affects contents of a stack, the expected result associated with content at a predetermined position in the stack, and
   execution of the first set of computer-executable instructions affects content at a first test position in the stack, and
   execution of the second set of computer-executable instructions affects content at a second test position in the stack,
   the test result based on content at the predetermined position in the stack after the operation is performed, the test result based on content at the first test position or the second test position or both.

3. The method according to claim 2, wherein the first test position is above or below the predetermined position in the stack, and wherein the second test position is above or below the predetermined position in the stack.

4. The method according to claim 2, wherein the stack comprises a protocol stack, and wherein
   execution of the first set of computer-executable instructions affects information within a network packet transmitted or received by a software layer associated with the first test position, and
   execution of the second set of computer-executable instructions affects information within a network packet transmitted or received by a software layer associated with the second test position.

5. The method according to claim 4, wherein the test result is selected from the group consisting of: information regarding the interoperability of the software application with another software layer at another logical position in the stack-based computing environment; information regarding statistical information, including information regarding load distribution performed by the software application; and information regarding performance of the software application.

6. The method according to claim 1, further comprising:
prior to executing the software application to perform the operation, identifying a configuration of the software application, the expected result based on the identified configuration.

7. The method according to claim 1, wherein the software application comprises a driver that links a peripheral device to an operating system of a computer.

8. The method according to claim 7, wherein the software application comprises a network filter driver.

9. The method according to claim 7, wherein
the first set of computer-executable instructions comprises a first filter driver that is used to simulate inputs to and validate outputs from a first interface of the software application, the first interface lying logically above the predetermined position in the stack, and
the second set of computer-executable instructions comprises a second filter driver that is used to simulate inputs to and validate outputs from a second interface of the software application, the second interface facing logically below the predetermined position in the stack.

10. The method according to claim 9, wherein the simulated inputs comprise invalid or corrupt inputs.

11. The method according to claim 1, wherein the first set of computer-executable instructions and the second set of computer-executable instructions comprise a single binary file that inserts itself at two different locations during runtime and dynamically determines its location.

12. The method according to claim 1, further comprising:
when it is determined that a failure of the software application occurred, identifying a programming error using the test result.

13. The method according to claim 1, wherein the step of identifying an operation performed during execution of the software comprises arranging for receipt of user input usable for identifying the operation.

14. The method according to claim 1, wherein the software application operates in a distributed client-server system.

15. The method according to claim 1, wherein the software application operates in a single-computer system.

16. A method for testing a software application, the software application executable at a predetermined position in a stack-based environment, the software application having a first interface and a second interface, the first interface lying logically above the predetermined position in the stack-based environment, the second interface facing logically below the predetermined position in the stack-based environment, the method comprising:
identifying an operation performed by the software application;
setting up a first software module logically above the predetermined position in the stack-based environment, the first software module operable to communicate with the software application via the first interface;
setting up a second software module logically below the predetermined position in the stack-based environment, the second software module operable to communicate with the software application via the second interface;
simulating an input to the software application using the first software module or the second software module or both; and
after the software application executes to perform the operation based on the simulated input, receiving a test output based on performance of the operation via the first software module or the second software module or both,
when the first software module is used for simulating the input, the second software module is used for receiving the test output, and
when the second software module is used for simulating the input, the first software module is used for receiving the test output,
the test output usable to identify a failure of the software application.

17. The method according to claim 16, wherein the simulated input comprises invalid or corrupt information.

18. The method according to claim 16, wherein the first software module and the second software module comprise a single binary file that inserts itself at two different locations during runtime and dynamically determines its location.

* * * * *